(No Model.) 2 Sheets—Sheet 1.

E. D. ROCKWELL.
BELL.

No. 500,951. Patented July 4, 1893.

Witnesses
Louis G. Julihn
Eric G. Julihn

Inventor
E. D. Rockwell
By Hopkins & Atkins
Attorneys (No Model.) 2 Sheets—Sheet 2.
E. D. ROCKWELL.
BELL.
No. 500,951. Patented July 4, 1893.
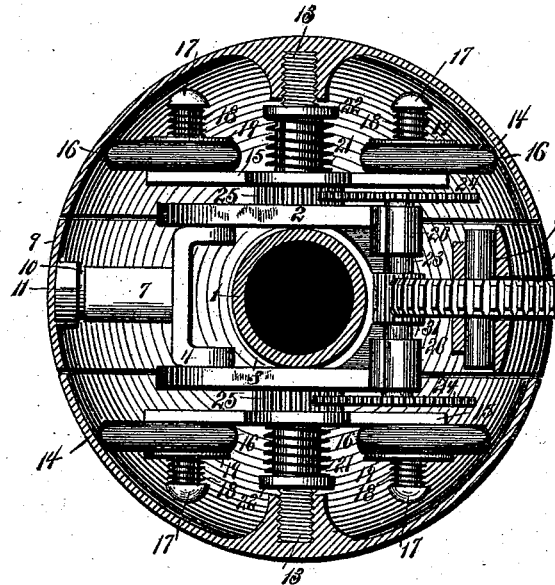
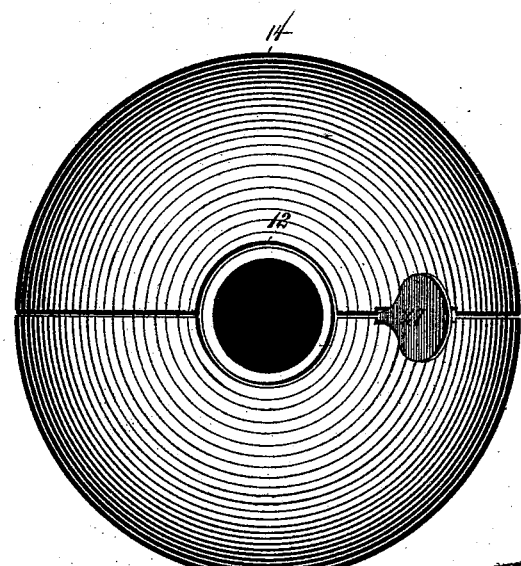
Witnesses
Louis G. Julihn.
Eric G. Julihn.
Inventor
E. D. Rockwell.
By Hopkins & Atkins
Attorneys

UNITED STATES PATENT OFFICE.

EDWARD DAYTON ROCKWELL, OF BRISTOL, CONNECTICUT.

BELL.

SPECIFICATION forming part of Letters Patent No. 500,951, dated July 4, 1893.

Application filed July 14, 1892. Serial No. 440,027. (No model.)

*To all whom it may concern:*

Be it known that I, EDWARD DAYTON ROCKWELL, of Bristol, county of Hartford, and State of Connecticut, have invented certain new and useful Improvements in Bells, of which the following is a specification, reference being had to the accompanying drawings.

The object of my invention is to produce an improved bell and bell mechanism that is especially adapted for use as an alarm upon bicycles; that is simple and neat in construction; that is particularly symmetrical and attractive; and that is especially adapted as a whole to be used as a chime bicycle bell— that is, a bell for use upon a bicycle that will give simultaneously a plurality of harmonious notes.

Figure 1:
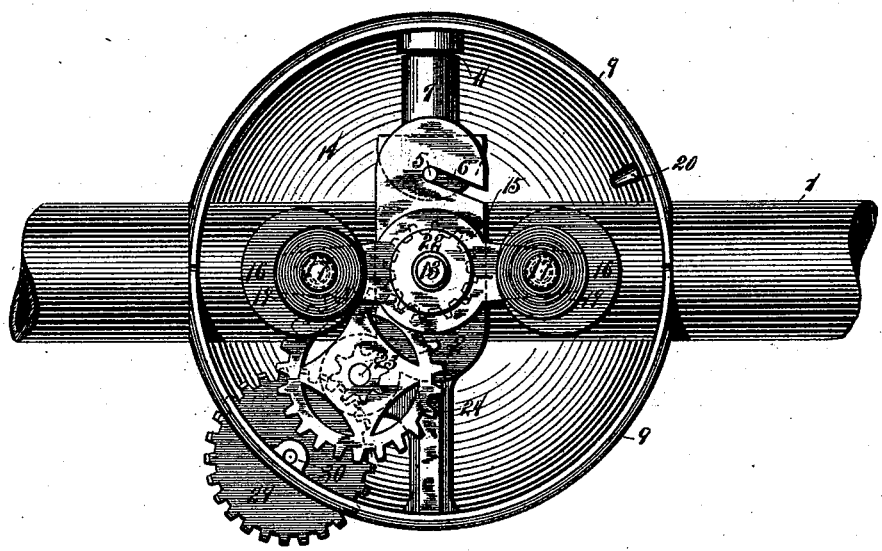
Figure 2:
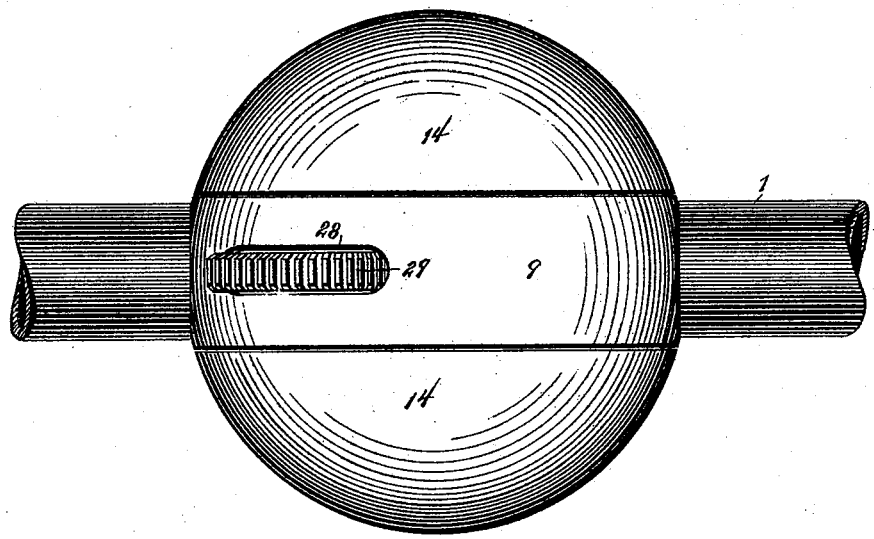

In the accompanying drawings, Figure 1 is a top plan view of the bell applied to a bicycle handle bar with the gong on that side removed. Fig. 2 is a side elevation of the same, looking toward the lever or handle. Fig. 3 is a central vertical section looking from one end. Fig. 4 is a view of a modified form of my device, showing a modified form of connecting gear for driving the mechanism. Fig. 5 shows a modified form of my bell with the semicircular stays removed.

Referring to the figures on the drawings, 1 indicates a section of a handle bar of a bicycle, which, for convenient explanation I illustrate and describe, it being understood that any other suitable support may be substituted therefor.

2 indicates a frame piece, which is bifurcated, as indicated at 3, for the admission of the handle-bar or supporting piece.

4 indicates a yoke provided with pivotal projections 5 on opposite sides, adapted to enter slots 6, let in corresponding positions into the sides of the bifurcated frame.

7 indicates a projection extending from the side of the yoke, and preferably internally screw-threaded.

In use the yoke is fastened to the frame-piece, and the two parts are securely fastened to a handle-bar, or the like. For this purpose I prefer to employ symmetrical semi-cylindrical stays 9, one of which is preferably cast integrally with the frame piece, and the other is a separate independent piece provided with an aperture 10, through which a screw 11 may be passed into the internally screw-threaded projection 7 of the yoke. The opposite ends of the stays are provided with semi-circular recesses 12 to neatly fit the circumference of the handle-bar, so as to give it the appearance of being formed upon it.

Any suitable mechanism for securing the frame-piece upon the handle-bar or support may be substituted for that which is shown. I prefer, however, the mechanism above described, on account of the symmetrical beauty of its appearance in combination with the gongs of the bell. Moreover the stays, as illustrated, form a covering for the frame-piece and yoke, whereby they are entirely concealed from view from the outside of the bell when the gongs are in place. These coverings—as I have called them in this connection—may be used in combination with any suitable frame-piece or mechanism for attaching the bell to a support, and as such coverings I desire to claim them.

The frame-piece is provided preferably on each side with a stud 13, which is externally screw-threaded to carry an internally screw-threaded gong 14 in the usual manner. When two gongs are employed and set in position, as illustrated in the drawings, the effect produced is that of a perfect globe borne upon the handle-bar. In practice the parts are usually made of bright metal, which materially enhances the beauty of the bell.

A bell of the description just given, namely, one having a pair of gongs carried on opposite sides of the handle-bar, and preferably in combination with stays, and the like, forming a complete globe, I consider to be a new and valuable invention without regard to the mechanism employed for sounding the bell. I however prefer the mechanism illustrated and now to be described.

15 indicates a striker-carrier, preferably centrally pivoted upon one of the studs 13 as an arbor.

16 indicates strikers carried on the extremities of the carrier, preferably of the loosely pivoted kind, and carried upon pins 17 and retained by springs 18 and washers 19 in a well known manner, and adapted to be thrown by centrifugal force against a lug 20 in their path. For retaining the striker in proper proximity to the frame-piece I prefer to employ a spring 21 seated at one end against the top of the carrier and at the other against a flange 22 fixed upon the stud. I also prefer to employ precisely similar mechanism upon the opposite stud 13, and to gear the parts together by a common shaft 23 and gears 24, meshing with the pinions 25 upon the inner side of each of the carriers respectively.

26 indicates suitable bearings for the shaft in the frame. It will be observed that by employing this mechanism I am able to drive the carriers synchronously, and by the aid of the simplest mechanism, and by the rotation of the shaft 23 to cause the two gongs to sound in imitation of electric bells, as desired.

For rotating the shaft 23 I may employ any suitable means, preferably by a lever 27 projecting through a slot 28 in the side of the bell, and in operative engagement with the shaft. I prefer to employ a continuous lever, as for example a gear wheel 29 carried in suitable bearings 30 in the stay 9, and meshing with a pinion 31 fixed upon the shaft. With this arrangement the gear presents its roughened surface at the outside of the bell, and may be conveniently operated by the thumb of the operator to sound the bell. It also possesses the merit of being always ready for operation without adjustment, as by a spring or any other device.

While I do not wish to confine myself to any particular form of lever, I prefer to use the continuous form, as illustrated; but do not desire to limit myself to any particular mechanism for operatively connecting it with the driving-shaft of the bell mechanism. Such connecting mechanism may be varied in many ways without departing from the scope of my invention, as for example I may employ a friction wheel 33 as illustrated in Fig. 4 of the drawings, which is provided with a peripheral groove 34, a cylindrical rubber ring embedded therein, in combination with a peripherally grooved small wheel 36 fastened to the shaft. The groove of the small wheel may be knurled if preferred; but the relations of the large wheel and the small wheel are substantially the same as the large gear and the small gear heretofore described. Power is communicated through the friction of the rubber ring upon the peripheral groove of the small wheel; while the soft rubber surface of the wheel 33 presents a more delicate surface for manipulation, which is desirable in bells manufactured for ladies' use.

What I claim is—

1. In bell mechanism, the combination with the gongs, of the frame piece located between the same, and provided with diametrical openings, so as to set over the handle of the bicycle, and internal mechanism for sounding the gong, operated by a wheel extending through a slot in the frame piece, substantially as specified.

2. The combination in a bicycle bell, of the frame piece having diametrical openings through which the handle bar passes, the gongs located on each side thereof, the toothed wheel journaled in bearings in the frame and extending through a slot in the periphery of the frame piece, and the train gearing with said toothed wheel, and with a striker carrier, the gongs and frame piece serving to conceal the internal mechanism piece, substantially as specified.

3. In a bell the combination with a frame-piece adapted to carry a gong and bell mechanism, of semi-cylindrical stay pieces within the gongs united to the frame-piece on opposite sides, and adapted to secure it in place upon a bicycle handle-bar, or like support, substantially as and for the purpose specified.

4. In bell mechanism the combination with the frame-piece adapted to carry a gong and suitable sounding mechanism, of a stay-piece on one end of the frame-piece, bifurcations on the other adapted to receive a handle-bar, or like support, located between the gongs of another stay piece and a yoke and also located between the gongs adapted to fasten the other stay piece to the bifurcations of the frame, substantially as and for the purpose specified.

5. In a bell the combination with a frame-piece and gongs, of a striker-carrier and striker thereon, and a continuous lever consisting of a cog wheel projecting from the side of the frame, and operatively connected with the carrier to drive it, substantially as and for the purpose specified.

6. In a bell the combination with a frame and gongs thereon on opposite sides, of striker carriers and striker adapted to sound the gongs, of a continuous lever consisting of a cog wheel projecting from the side of the frame, and mechanism connecting said lever with the striker carriers to operate them, substantially as and for the purpose specified.

In testimony of all which I have hereunto subscribed my name.

EDWARD DAYTON ROCKWELL.

Witnesses:
E. B. SPRING,
ROGER S. NEWELL.